US 8,902,512 B2

(12) United States Patent
Lee

(10) Patent No.: US 8,902,512 B2
(45) Date of Patent: Dec. 2, 2014

(54) WIDE-ANGLE IMAGING LENS ASSEMBLY WITH FIVE LENSES

(71) Applicant: Ability Opto-Electronics Technology Co., Ltd, Taichung County (TW)

(72) Inventor: Hung-wen Lee, Taichung (TW)

(73) Assignee: Ability Opto-Electronics Technology Co., Ltd., Taichung County (TW)

( * ) Notice: Subject to any disclaimer, the term of this patent is extended or adjusted under 35 U.S.C. 154(b) by 0 days.

(21) Appl. No.: 13/963,078

(22) Filed: Aug. 9, 2013

(65) Prior Publication Data
US 2014/0313594 A1    Oct. 23, 2014

(30) Foreign Application Priority Data

Apr. 18, 2013    (TW) ................. 102207059 U

(51) Int. Cl.
*G02B 3/02* (2006.01)
*G02B 25/00* (2006.01)
*G02B 9/60* (2006.01)

(52) U.S. Cl.
USPC ........... 359/714; 359/643; 359/737; 359/740; 359/746; 359/763; 359/770

(58) Field of Classification Search
USPC .......... 359/643, 714, 737, 740, 746, 763, 770
See application file for complete search history.

(56) References Cited

U.S. PATENT DOCUMENTS

| 7,639,432 | B2* | 12/2009 | Asami ........................... 359/770 |
| 8,248,713 | B2* | 8/2012 | Hsieh et al. ................... 359/753 |
| 8,477,432 | B2* | 7/2013 | Huang et al. .................. 359/714 |
| 8,593,737 | B2* | 11/2013 | Tang et al. .................... 359/714 |
| 8,649,113 | B1* | 2/2014 | Tsai et al. ..................... 359/714 |
| 2007/0236811 | A1* | 10/2007 | Mori ............................. 359/770 |
| 2011/0316969 | A1* | 12/2011 | Hsieh et al. ................... 359/793 |
| 2012/0194922 | A1* | 8/2012 | Tang et al. .................... 359/716 |
| 2012/0307382 | A1* | 12/2012 | Hsu et al. ...................... 359/770 |
| 2012/0314304 | A1* | 12/2012 | Huang .......................... 359/759 |
| 2012/0327520 | A1* | 12/2012 | Tsai et al. ..................... 359/714 |
| 2014/0085735 | A1* | 3/2014 | Shih ............................. 359/714 |
| 2014/0146399 | A1* | 5/2014 | Ko ................................ 359/714 |

* cited by examiner

*Primary Examiner* — Evelyn A. Lester
(74) *Attorney, Agent, or Firm* — Ming Chow; Sinorica, LLC

(57) ABSTRACT

An imaging lens assembly comprises a fixing diaphragm and an optical set including five lenses. An arranging order from an object side to an image side is: a first lens; the fixing diaphragm; a second lens; a third lens; a fourth lens; and a fifth lens. At least one surface of the five lenses is aspheric. By the concatenation between the lenses and the adapted curvature radius, thickness/interval, refractivity, and Abbe numbers, the assembly attains a big diaphragm with wide-angle, a shorter height, and a better optical aberration.

4 Claims, 12 Drawing Sheets

WIDE-ANGLE IMAGING LENS ASSEMBLY WITH FIVE LENSES

The current application claims a foreign priority to the patent application of Taiwan No. 102207059 filed on Apr. 18, 2013.

BACKGROUND OF THE INVENTION

1. Field of the Invention

The present invention relates to a wide-angle imaging lens assembly with five lenses, in particular to a lens structure attaining a shorter height and a high resolution by curvature, interval and optical parameter between each lens.

2. Description of the Related Art

The conventional lens structure adopts an image display lens assembly which is applied to smart phone, tablet PC, cell phone, notebook, and webcam. The electronic products are developed to become lighter, thinner, shorter, and smaller and provide with higher efficiency. A video sensor of the image display lens assembly, such as Charge Coupled Device (CCD) or Complementary Metal Oxide Semiconductor (CMOS), is also developed for more pixels, so the lens structure is ceaselessly developed to be provided with compactness and higher resolution.

Therefore, the present invention is disclosed in accordance with a lens structure with multi-lens for a demand of the development of the image display lens assembly, especially to an imaging lens assembly of a lens structure with at least five lenses.

SUMMARY OF THE INVENTION

In view of the conventional lens structure that has big volume and lack of efficiency, a wide-angle imaging lens assembly with five lenses is disclosed.

It is an object of the present invention to provide a wide-angle imaging lens assembly with five lenses, which comprises a fixing diaphragm and an optical set. The optical set includes a first lens, a second lens, a third lens, a fourth lens, and a fifth lens, an arranging order thereof from an object side to an image side is: the first lens with a negative refractive power and a convex surface directed toward the object side, at least one surface of the first lens is aspheric; the fixing diaphragm; the second lens with a positive refractive power and a convex surface directed toward the image side, at least one surface of the second lens is aspheric; the third lens having a lens with a positive refractive power and a convex surface directed toward the image side, at least one surface of the third lens is aspheric; the fourth lens having a lens with a positive refractive power and convex surfaces directed toward the object side and the image side, at least one surface of the fourth lens is aspheric; and the fifth lens with a concave surface directed toward the object side and a concave surface with a corrugated contour directed toward the image side and disposed near an optical axis, at least one surface of the fifth lens is aspheric.

The imaging lens assembly satisfies the following conditional expressions: $2<TL/f<2.5$ and $-5<R7/R8<-2$. The TL is defined as a distance from a top point of the object side of the first lens to an imaging surface side. The f is defined as a focal length of the entire lens assembly. The R7 is defined as a radius of a proximal curvature of an object side surface of the fourth lens. The R8 is defined as a radius of a proximal curvature of an image side surface of the fourth lens.

The imaging lens assembly satisfies the following conditional expression: $0.5<f4/f<1.5$. The f4 is defined as a focal length of the fourth lens. The f is defined as a focal length of the entire lens assembly.

A shape of the aspheric surface satisfies a formula of:

$$z = \frac{ch^2}{1+[1-(k+1)c^2h^2]^{0.5}} + Ah^4 + Bh^6 + Ch^8 + Dh^{10} + Eh^{12} + Gh^{14} + \ldots$$

The z is defined as a position value about a location at a height of h along a direction of the optical axis referring to a surface top point. The k is defined as a conic constant. The c is a reciprocal of a radius of a curvature. The A, B, C, D, E, G, etc. are defined as high-order aspheric surface coefficients.

The present invention is characterized in that a lens structure attains a big diaphragm with wide-angle, a shorter height, and a high resolution by curvature, interval, and optical parameter between each lens.

DETAILED DESCRIPTION OF THE PREFERRED EMBODIMENTS

Figure 1:
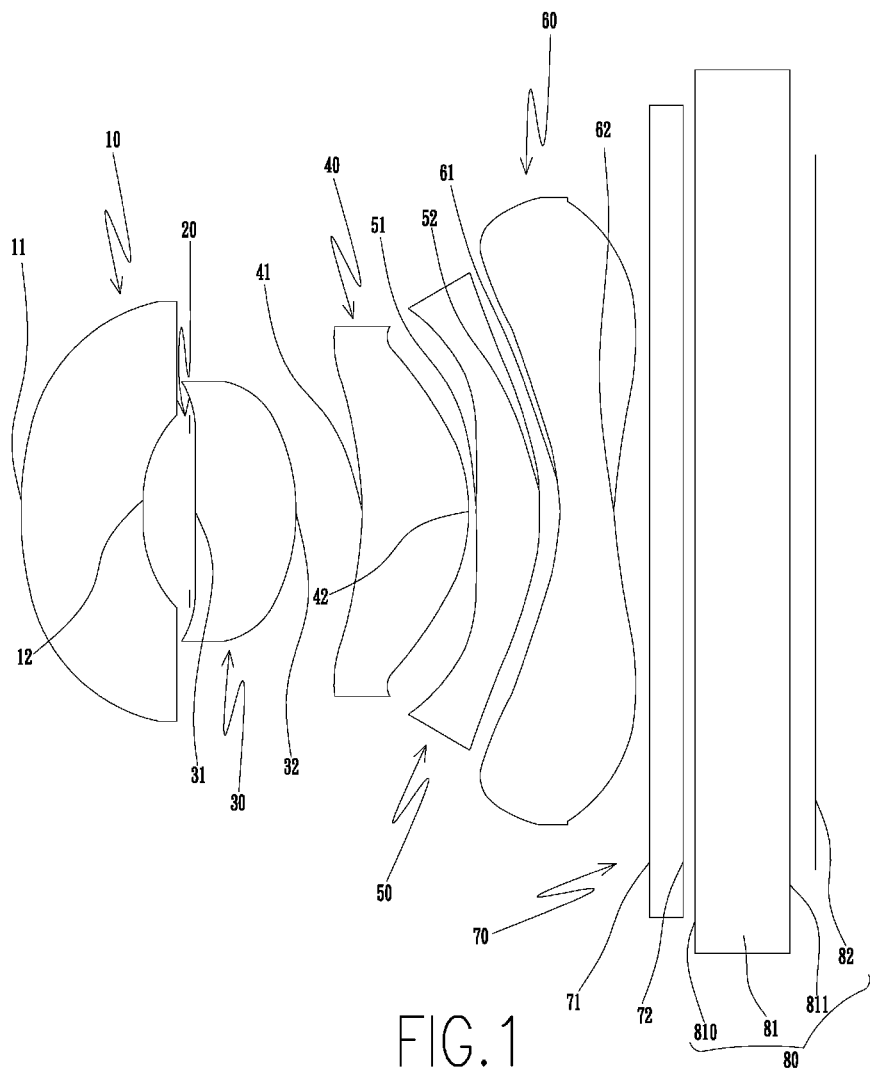
FIG. 1 is a schematic view showing an optical structure of a first preferred embodiment of the present invention.

Before describing in detail, it should note that the like elements are denoted by the similar reference numerals throughout disclosure.

The present invention provides an imaging lens structure, in particular to a lens structure attaining a big diaphragm with wide-angle, a shorter height, and a high resolution by a curvature, an interval, and an optical parameter between each lens.

Referring to FIG. 1, a schematic view of an optical structure of a wide-angle imaging lens assembly with five lenses is shown. The structure of the imaging lens comprises a fixing diaphragm 20 and an optical set. The optical set includes a first lens 10, a second lens 30, a third lens 40, a fourth lens 50, and a fifth lens 60, an arranging order thereof from an object side to an image side is: the first lens 10 with a negative refractive power and a convex surface directed toward the object side, at least one surface of the first lens 10 is aspheric; the fixing diaphragm 20; the second lens 30 with a positive refractive power and a convex surface directed toward the image side, at least one surface of the second lens 30 is aspheric; the third lens 40 having a lens with a positive refractive power and a convex surface directed toward the image side, at least one surface of the third lens 40 is aspheric; the fourth lens 50 having a lens with a positive refractive power and convex surfaces directed toward the object side and the image side, at least one surface of the fourth lens 50 is aspheric; the fifth lens 60 with a concave surface directed toward the object side and a concave surface with a corrugated contour directed toward the image side and disposed near an optical axis, and has at least one surface aspheric. A filter unit 70 filtering light with specific wave length is adopted by an infrared stopping filter unit for being used for a visible light image. An image sensor 80 (an imaging surface side) is used for receiving a digital signal transformed by an infrared invisible light image of the filter. The image sensor 80 includes a flat protection lens 81 and a video sensor 82. The video sensor 82 is preferably adopted by Charge Coupled Device (CCD) or Complementary Metal Oxide Semiconductor (CMOS).

The imaging lens assembly satisfies the following conditional expression: 2<TL/f<2.5 and −5<R7/R8<−2. The TL is defined as a distance from a top point of the object side of the first lens to the imaging surface side. The f is defined as a focal length of the entire lens assembly. The R7 is defined as a radius of a proximal curvature of an object side surface of the fourth lens. The R8 is defined as a radius of a proximal curvature of an image side surface of the fourth lens.

The imaging lens assembly satisfies the following conditional expression: 0.5<f4/f<1.5. The f4 is defined as a focal length of the fourth lens. The f is defined as the focal length of the entire lens assembly.

The first lens 10 includes a first surface 11 facing an object side and a second surface 12 facing the imaging surface side. The first surface 11 is defined as a convex surface opposite to the object side. The second surface 12 is defined as a concave surface opposite to the imaging surface side. The second lens 30 includes a third surface 31 facing the object side and a fourth surface 32 facing the imaging surface side. The third surface 31 is defined as a convex surface opposite to the object side. The fourth surface 32 is defined as a convex surface opposite to the imaging surface side. The third lens 40 includes a fifth surface 41 facing the object side and a sixth surface 42 facing the imaging surface side. The fifth surface 41 is defined as a concave surface opposite to the object side. The sixth surface 42 is defined as a convex surface opposite to the imaging surface side. The fourth lens 50 includes a seventh surface 51 facing the object side and a eighth surface 52 facing the imaging surface side. The seventh surface 51 is defined as a convex surface opposite to the object side. The eighth surface 52 is defined as a convex surface opposite to the imaging surface side. The fifth lens 60 includes a ninth surface 61 facing the object side and a tenth surface 62 facing the imaging surface side. The ninth surface 61 is defined as a concave surface opposite to the object side. The tenth surface 62 is defined as a concave surface opposite to the imaging surface side. At least one surface of the first lens 10, the second lens 30, the third lens 40, the fourth lens 50, and fifth lens 60 is aspheric, thereby correcting the spherical aberration and the image aberration for having a characteristic of low common difference sensitivity.

A shape of the aspheric surface of the imaging lens assembly satisfies a formula of:

$$z = \frac{ch^2}{1 + [1 - (k+1)c^2h^2]^{0.5}} + Ah^4 + Bh^6 + Ch^8 + Dh^{10} + Eh^{12} + Gh^{14} + \ldots$$

The z is defined as a position value about a location at a height of h along a direction of the optical axis referring to a surface top point. The k is defined as a conic constant. The c is a reciprocal of a radius of a curvature. The A, B, C, D, E, G, etc. are defined as high-order aspheric surface coefficients.

In an ultra-wide-angle micro-optical image capturing device of the present invention, the fixing diaphragm 20 is disposed between the object and the second lens 30 for getting an incident beam. The first lens 10 is adopted by a lens with negative refractive power, and the second lens 30, the third lens 40, and the fourth lens 50 are adopted by lenses with positive refractive power. The first lens 10 adopts the first surface 11 defined convex to the object side for assembling the external incident beam with ultra-wide-angle and keeping the beam on the second surface 12 of the first lens 10, thereby presenting a function of the aspheric surface, correcting the aberration, reducing the common difference sensitivity, and rendering the device have ultra-wide-angle with an image-capture angle over 85°. The third surface 31 defined on the second lens 30 as a convex surface opposite to the object side is then expanded. The fourth surface 32 is defined as a lens with positive refractive power and a convex surface opposite to the imaging surface side. The fourth lens 50 is dispersed via the seventh surface 51 that is defined concave to the imaging surface side, so that the beam is able to be spread on the tenth surface 62 of the fifth lens 60 with a larger dimension. That is to say, the incident beam is expanded by the third surface 31 for being spread on the tenth surface 62 with a larger dimension. The second lens 30 is defined as meniscus shape for presenting the function of aspheric surface, correcting the aberration, and reducing common difference sensitivity.

The aspheric surface corrects the spherical aberration and the image aberration also reduces the full length of the lens optical system. The first lens 10, the second lens 30, the third lens 40, the fourth lens 50, and the fifth lens 60 are preferably adopted by plastic, which is conducive to eliminate the aberration and reduce the weight of the lens. The entire optical system is composed of five plastic lenses and good for a mass production, and the low common difference sensitivity thereof is conformed to a demand of the mass production. The filter unit 70 used for filtering infrared invisible light and allowing visible light forms an ultra-wide-angle micro-optical image capturing device capable of capturing the sight that people see.

By the concatenation between the above-mentioned surfaces of lenses and the adapted curvature radius, thickness/interval, refractivity, and Abbe numbers, the assembly attains a big diaphragm with wide-angle, a shorter height, and a better optical aberration.

First Preferred Embodiment of the Present Invention

Due to the above-mentioned technique of the present invention, it is able to be practiced in accordance with the following values:

| Basic lens data of the first preferred embodiment | | | | | |
|---|---|---|---|---|---|
| Surfaces | | Curvature radius (Radius) | Thickness/Interval (Thickness) | Refractivity (Nd) | Abbe number (Vd) |
| First lens 10 | First surface 11 | 1.60 | 0.52 | 1.635500 | 23.891420 |
| | Second surface 12 | 1.00 | 0.20 | | |
| Fixing diaphragm 20 | | ∞ | 0.02 | | |
| Second lens 30 | Third surface 31 | 7.80 | 0.43 | 1.544100 | 56.093602 |
| | Fourth surface 32 | −0.99 | 0.28 | | |
| Third lens 40 | Fifth surface 41 | −1.45 | 0.45 | 1.544100 | 56.093602 |
| | Sixth surface 42 | −0.70 | 0.03 | | |
| Fourth lens 50 | Seventh surface 51 | 3.88 | 0.27 | 1.635500 | 23.891420 |
| | Eighth surface 52 | −1.04 | 0.08 | | |
| Fifth lens 60 | Ninth surface 61 | −0.82 | 0.23 | 1.635500 | 23.891420 |
| | Tenth surface 62 | −1.36 | 0.14 | | |
| Filter unit 70 | Eleventh surface 71 | ∞ | 0.15 | 1.516800 | 64.167336 |
| | Twelfth surface 72 | ∞ | 0.05 | | |
| Flat protection lens 81 | Thirteenth surface 810 | ∞ | 0.40 | 1.516800 | 64.167336 |
| | Forteenth surface 811 | ∞ | 0.10 | | |

The filter unit 70 has a thickness of 0.15 mm and is adopted by an infrared stopping filter unit. A wave length of the light passing therethrough is 450~650 mm. A thickness of the flat protection lens 51 is 0.4 mm.

The values of quadratic surface coefficient of the aspheric surface of the first preferred embodiment are listed as follows:

The First Surface 11 ($k=0.86$):
A: 0.232645
B: −0.121370
C: 0.841938
D: −1.410559
E: 1.480537
F: 0.000000
G: 0.000000

The Second Surface 12 ($k=2.43$):
A: 0.801266
B: 1.705244
C: −10.894925
D: 117.550565
E: −0.000597
F: 0.000000
G: 0.000000

The Third Surface 31 ($k=-210.96$)
A: −0.268981
B: 1.336946
C: −22.627574
D: 40.524940
E: 0.000754
F: 0.000000
G: 0.000000

The Fourth Surface 32 ($k=2.21$)
A: −0.101628
B: −0.424873
C: 1.147020
D: −4.831594
E: 0.000000
F: 0.000000
G: 0.000000

The Fifth Surface 41 ($k=0.00$)
A: 0.357237
B: −1.541724
C: 4.006903
D: −2.674015
E: 0.000000
F: 0.000000
G: 0.000000

The Sixth Surface 42 ($k=-0.80$)
A: −0.107983
B: 0.638276
C: −2.163439
D: 3.908843
E: 0.000000
F: 0.000000
G: 0.000000

The Seventh Surface 51 ($k=-800.00$)
A: −0.402738
B: −1.567617
C: 4.281206
D: −3.977453
E: −0.638916
F: 1.919277
G: 0.000000

The Eighth Surface 52 ($k=-0.70$)
A: 0.270595
B: −0.111253
C: 0.189832
D: −0.124226
E: −0.003293
F: 0.000000
G: 0.000000

The Ninth Surface 61 ($k=-4.10$)
A: 0.332181
B: −0.505655
C: 0.218994
D: 0.004945
E: 0.001110
F: 0.000000
G: 0.000000

The Tenth Surface 62 ($k=0.00$)
A: −0.516960
B: 0.185148
C: 0.009090
D: −0.122669
E: 0.075173
F: −0.017979
G: 0.000000

According to the above-mentioned values, the related exponent of performance of the micro-image capturing lens is: $f=1.55$ mm; $TL=3.35$ mm; $TL/f=2.16$; $f4=1.31$ mm; $f4/f=0.85$; $R7/R8=-3.73$.

Figure 2:
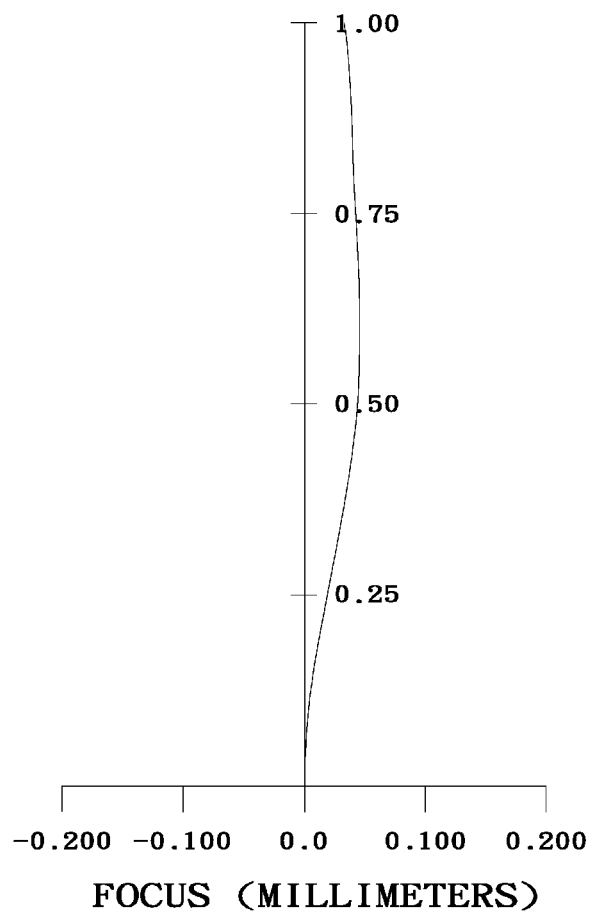
FIG. 2 is a schematic view showing a spherical aberration of the first preferred embodiment of the present invention.
Figure 3:
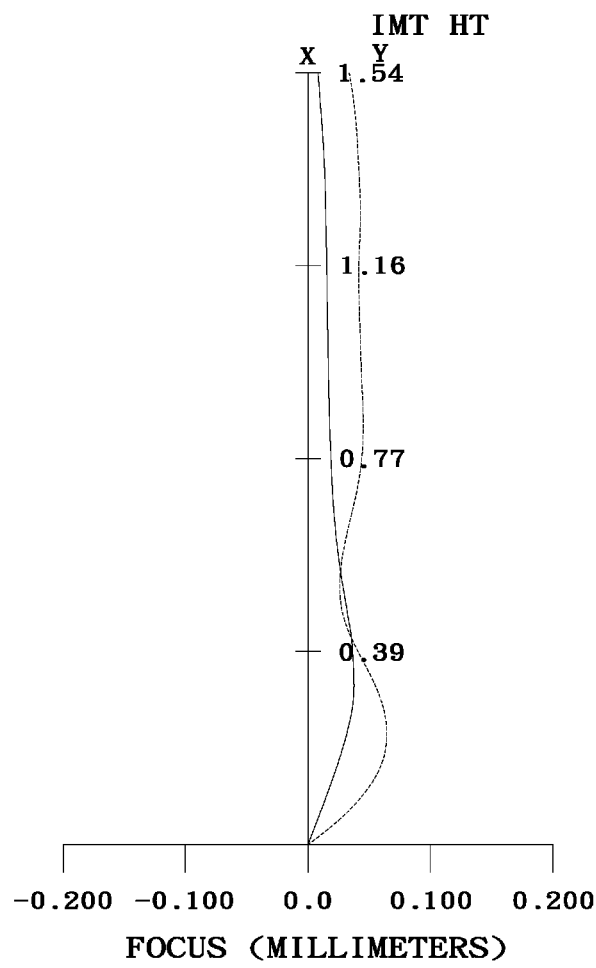
FIG. 3 is a schematic view showing an astigmatic aberration of the first preferred embodiment of the present invention.
Figure 4:
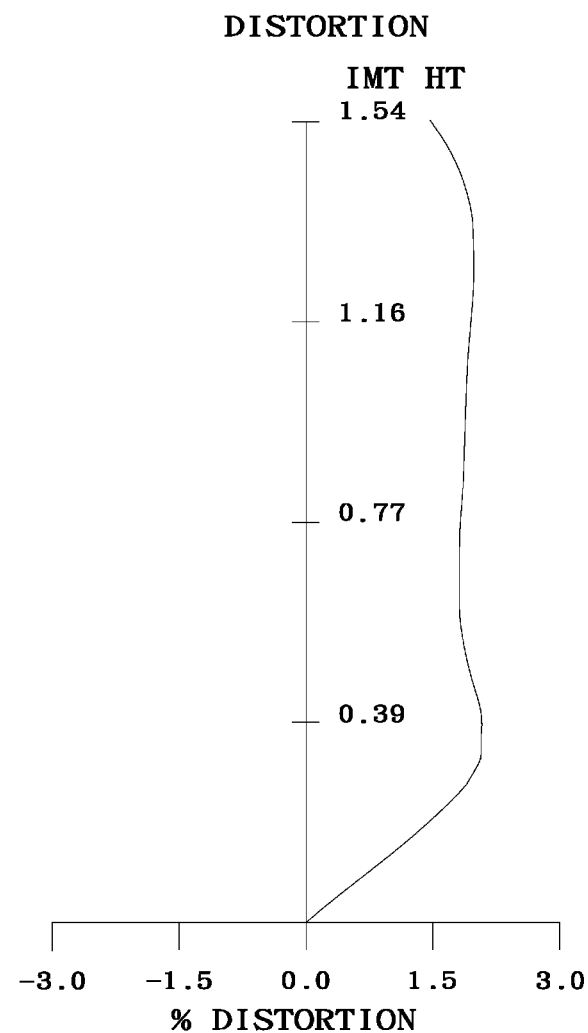
FIG. 4 is a schematic view showing a distorted aberration of the first preferred embodiment of the present invention.
Figure 5:
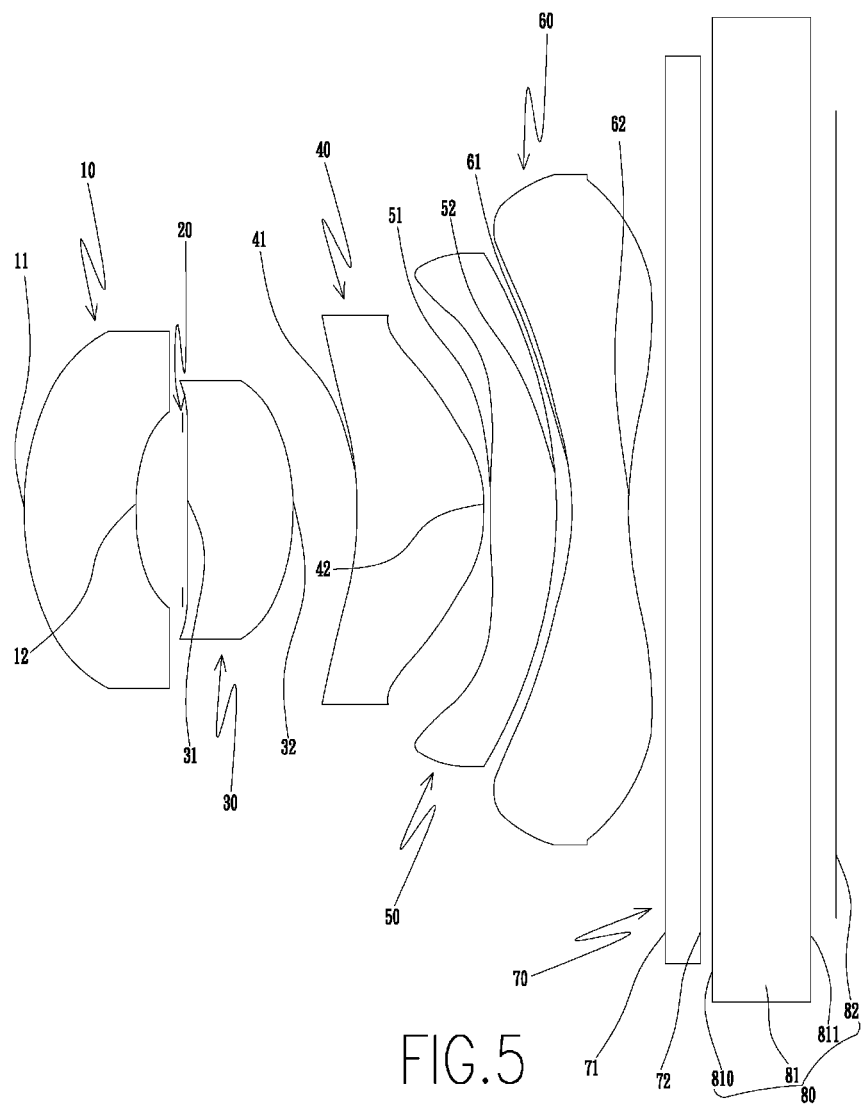
FIG. 5 is a schematic view showing an optical structure of a second preferred embodiment of the present invention.

Referring to FIG. 2, a schematic view of a spherical aberration of the first preferred embodiment of the present invention is shown. Referring to FIG. 3, a schematic view of an astigmatic aberration of the first preferred embodiment of the present invention is shown. Referring to FIG. 4, a schematic view of a distorted aberration of the first preferred embodiment of the present invention is shown. The measured astigmatic aberration, distorted aberration, and spherical aberration are in the standard scope and have a good optical performance and imaging quality according to the above-mentioned figures.

Second Preferred Embodiment of the Present Invention

Due to the above-mentioned technique of the present invention, it is able to be practiced in accordance with the following values:

| | Basic lens data of the second preferred embodiment | | | | |
|---|---|---|---|---|---|
| | Surfaces | Curvature radius (Radius) | Thickness/Interval (Thickness) | Refractivity (Nd) | Abbe number (Vd) |
| First lens 10 | First surface 11 | 1.40 | 0.46 | 1.635500 | 23.891420 |
| | Second surface 12 | 0.96 | 0.19 | | |
| Fixing diaphragm 20 | | ∞ | 0.02 | | |
| Second lens 30 | Third surface 31 | 10.71 | 0.44 | 1.544100 | 56.093602 |
| | Fourth surface 32 | −1.03 | 0.27 | | |
| Third lens 40 | Fifth surface 41 | −1.36 | 0.52 | 1.534611 | 56.072163 |
| | Sixth surface 42 | −0.55 | 0.03 | | |
| Fourth lens 50 | Seventh surface 51 | 3.63 | 0.27 | 1.635500 | 23.891420 |
| | Eighth surface 52 | −1.63 | 0.07 | | |
| Fifth lens 60 | Ninth surface 61 | −0.84 | 0.23 | 1.635500 | 23.891420 |
| | Tenth surface 62 | 1.412 | 0.15 | | |
| Filter unit 70 | Eleventh surface 71 | ∞ | 0.15 | 1.516800 | 64.167336 |
| | Twelfth surface 72 | ∞ | 0.05 | | |
| Flat protection lens 81 | Thirteenth surface 810 | ∞ | 0.40 | 1.516800 | 64.167336 |
| | Forteenth surface 811 | ∞ | 0.10 | | |

The filter unit 70 has a thickness of 0.15 mm and is adopted by an infrared stopping filter unit. A wave length of the light passing therethrough is 450~650 mm. A thickness of the flat protection lens 51 is 0.4 mm.

The values of quadratic surface coefficient of the aspheric surface of the second preferred embodiment are listed as follows:

The First Surface 11 (k=1.45):
A: 0.209619
B: −0.020156
C: 0.590108
D: −1.124444
E: 1.855823
F: 0.000000
G: 0.000000
The Second Surface 12 (k=1.13)
A: 0.969740
B: 1.057437
C: 1.603509
D: 84.717401
E: −0.000228
F: 0.000000
G: 0.000000
The Third Surface 31 (k=93.28)
A: −0.271643
B: 1.193688
C: −19.205309
D: 40.766047
E: 0.000572
F: 0.000000
G: 0.000000
The Fourth Surface 32 (k=2.32)
A: −0.026576
B: −0.115834
C: −0.821811
D: −2.504787
E: 0.000000
F: 0.000000
G: 0.000000
The Fifth Surface 41 (k=0.00)
A: 0.373095
B: −0.620185
C: 1.397704
D: −1.051130
E: 0.000000
F: 0.000000
G: 0.000000
The Sixth Surface 42 (k=−1.07)
A: 0.432439
B: −0.566663
C: −0.370692
D: 1.898324
E: 0.000000
F: 0.000000
G: 0.000000
The Seventh Surface 51 (k=−797.19)
A: −0.096287
B: −1.317239
C: 2.174502
D: −1.869304
E: 0.096900
F: 0.681507
G: 0.000000
The Eighth Surface 52 (k=−11.21)
A: −0.026063
B: −0.312498
C: 0.371701
D: −0.041388
E: −0.068771
F: 0.000000
G: 0.000000

According to the above-mentioned values, the related exponent of performance of the micro-image capturing lens is: f=1.55 mm; TL=3.35 mm; TL/f=2.16; f4=1.80 mm; f4/f=1.16; R7/R8=−2.22.

Figure 6:
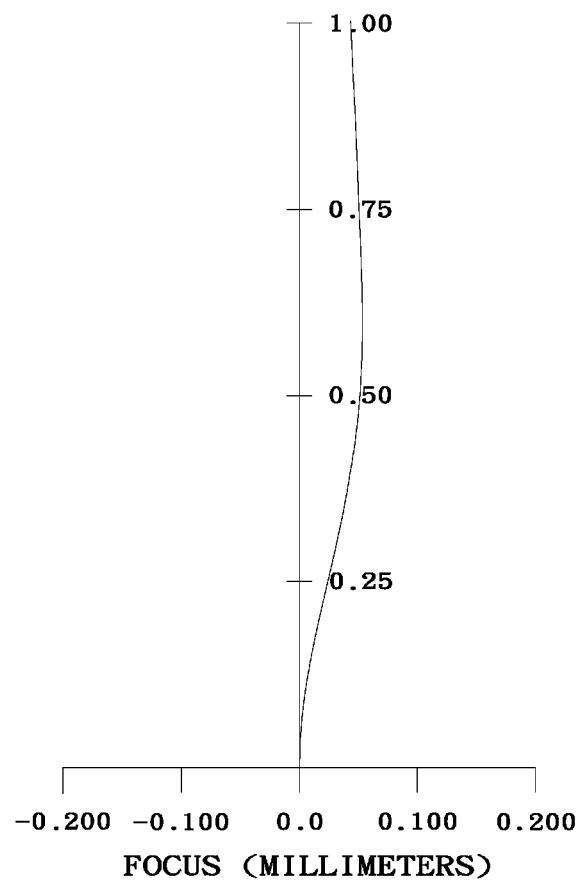
FIG. 6 is a schematic view showing a spherical aberration of the second preferred embodiment of the present invention.
Figure 7:
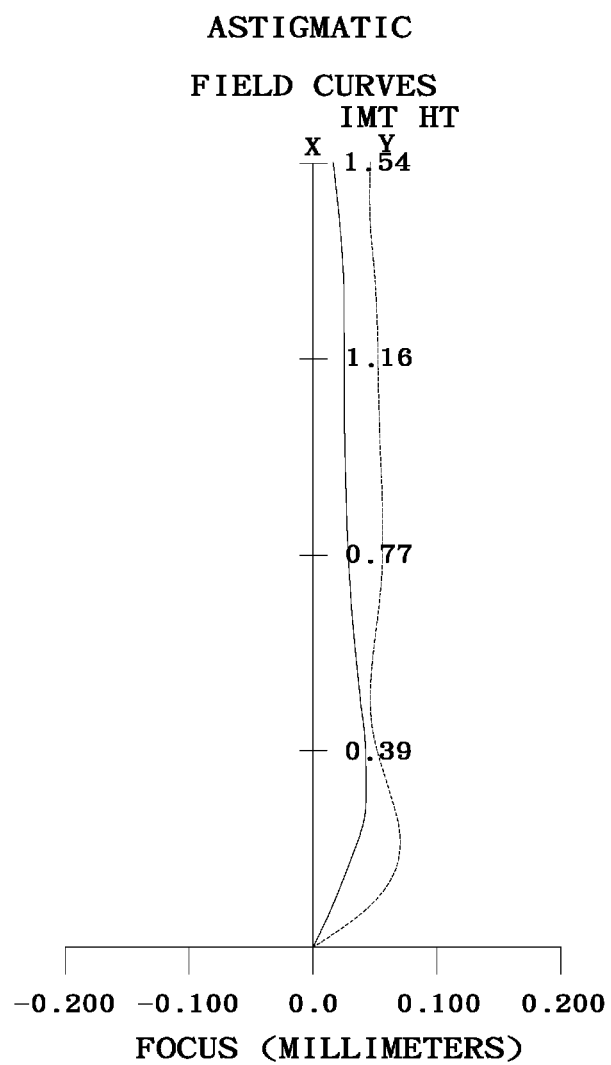
FIG. 7 is a schematic view showing an astigmatic aberration of the second preferred embodiment of the present invention.
Figure 8:
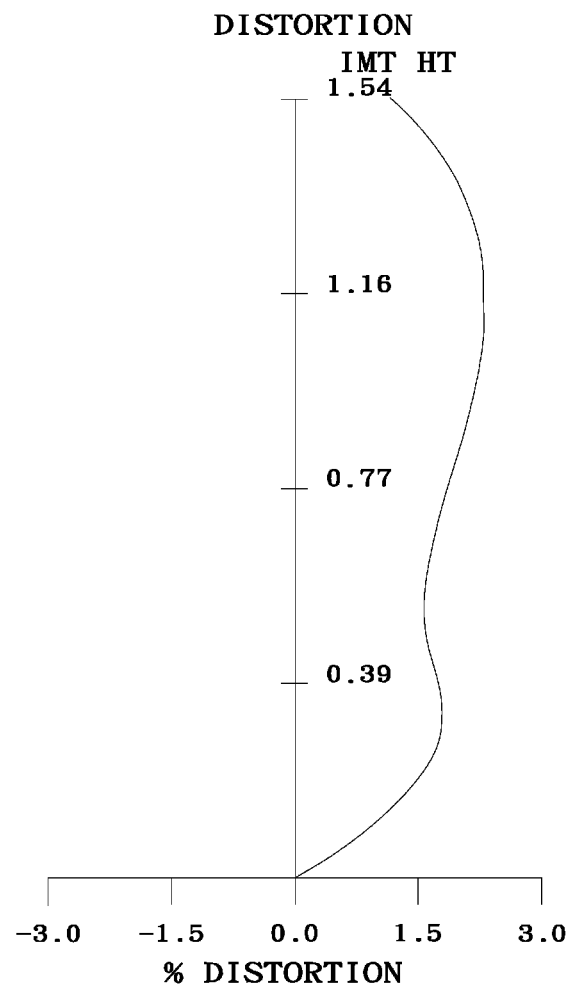
FIG. 8 is a schematic view showing a distorted aberration of the second preferred embodiment of the present invention.
Figure 9:
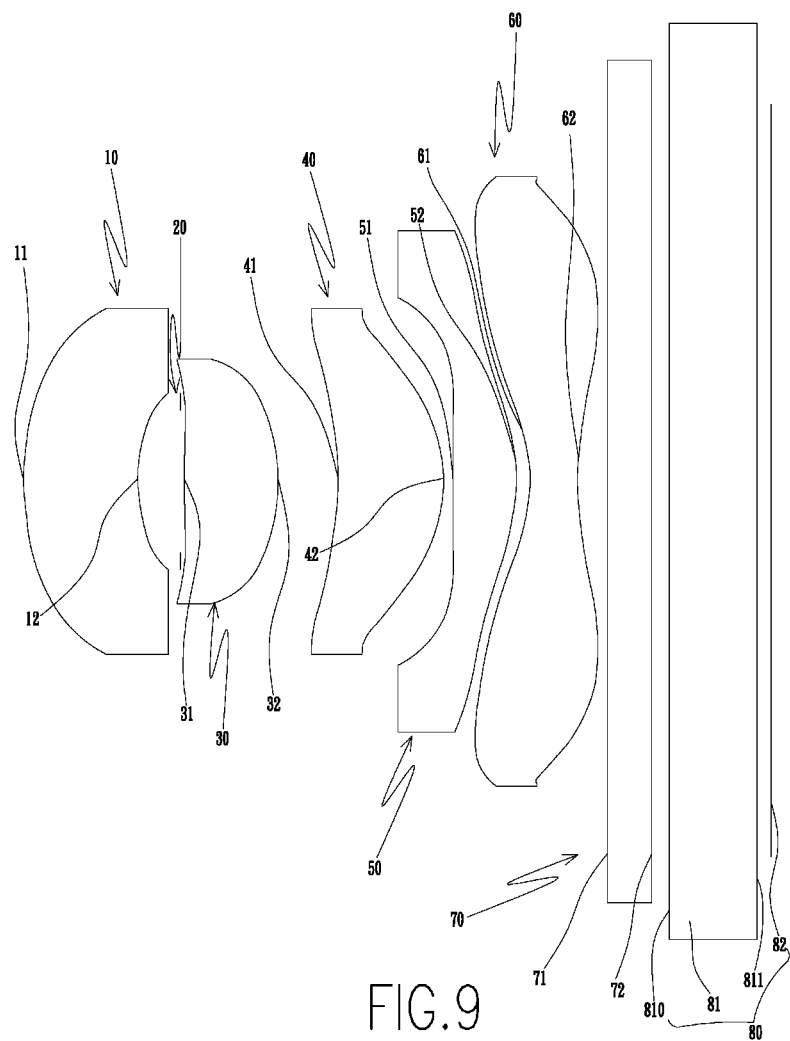
FIG. 9 is a schematic view showing an optical structure of a third preferred embodiment of the present invention.

Referring to FIG. 6, a schematic view of a spherical aberration of the second preferred embodiment of the present invention is shown. Referring to FIG. 7, a schematic view of an astigmatic aberration of the second preferred embodiment of the present invention is shown. Referring to FIG. 8, a schematic view of a distorted aberration of the second preferred embodiment of the present invention is shown. The measured astigmatic aberration, distorted aberration, and spherical aberration are in the standard scope and have a good optical performance and imaging quality according to the above-mentioned figures.

Third Preferred Embodiment of the Present Invention

Due to the above-mentioned technique of the present invention, it is able to be practiced in accordance with the following values:

Basic lens data of the third preferred embodiment

| | Surfaces | Curvature radius (Radius) | Thickness/Interval (Thickness) | Refractivity (Nd) | Abbe number (Vd) |
|---|---|---|---|---|---|
| First lens 10 | First surface 11 | 1.52 | 0.52 | 1.635500 | 23.891420 |
| | Second surface 12 | 0.97 | 0.19 | | |
| Fixing diaphragm 20 | | ∞ | 0.02 | | |
| Second lens 30 | Third surface 31 | 9.09 | 0.42 | 1.544100 | 56.093602 |
| | Fourth surface 32 | −1.01 | 0.27 | | |
| Third lens 40 | Fifth surface 41 | −1.56 | 0.48 | 1.534611 | 56.072163 |
| | Sixth surface 42 | −0.65 | 0.04 | | |
| Fourth lens 50 | Seventh surface 51 | 3.84 | 0.29 | 1.635500 | 23.891420 |
| | Eighth surface 52 | −0.80 | 0.06 | | |
| Fifth lens 60 | Ninth surface 61 | −0.62 | 0.21 | 1.635500 | 23.891420 |
| | Tenth surface 62 | 1.39 | 0.15 | | |
| Filter unit 70 | Eleventh surface 71 | ∞ | 0.21 | 1.516800 | 64.167336 |
| | Twelfth surface 72 | ∞ | 0.05 | | |
| Flat protection lens 81 | Thirteenth surface 810 | ∞ | 0.40 | 1.516800 | 64.167336 |
| | Forteenth surface 811 | ∞ | 0.07 | | |

The filter unit 70 has a thickness of 0.21 mm and is adopted by an infrared stopping filter unit. A wave length of the light passing therethrough is 450~650 mm. A thickness of the flat protection lens 51 is 0.4 mm. A distance from the optical image capturing device to the object side is 600 mm.

The values of quadratic surface coefficient of the aspheric surface of the third preferred embodiment are listed as follows:

The First Surface 11 (k=1.39):
A: 0.214615
B: −0.168777
C: 1.032680
D: −1.868277
E: 1.929768
F: 0.000000
G: 0.000000
The Second Surface 12 (k=3.15)
A: 0.711546
B: 0.763973
C: −6.778655
D: 96.477233
E: −0.000892
F: 0.000000
G: 0.000000
The Third Surface 31 (k=−229.07)
A: −0.270540
B: 1.379374
C: −21.686585
D: 45.906406
E: 0.001128
F: 0.000000
G: 0.000000
The Fourth Surface 32 (k=2.34)
A: −0.088940
B: −0.484299
C: 1.016301
D: −4.422534
E: 0.000000
F: 0.000000
G: 0.000000
The Fifth Surface 41 (k=0.00)
A: 0.315553
B: −1.281955
C: 3.347837
D: −2.393003
E: 0.000000
F: 0.000000
G: 0.000000
The Sixth Surface 42 (k=−0.74)
A: 0.305369
B: −0.787992
C: 0.658988
D: 1.511261
E: 0.000000
F: 0.000000
G: 0.000000
The Seventh Surface 51 (k=−800.00)
A: −0.017336
B: −1.927675
C: 3.791029
D: −4.177236
E: 1.622830
F: −0.167979
G: 0.000000
The Eighth Surface 52 (k=−1.77)
A: 0.676409
B: −0.553714
C: 0.099829
D: 0.100290
E: −0.051184
F: 0.000000
G: 0.000000

According to the above-mentioned values, the related exponent of performance of the micro-image capturing lens is: f=1.55 mm; TL=3.37 mm; TL/f=2.17; f4=1.06 mm; f4/f=0.69; R7/R8=−4.78.

Figure 10:
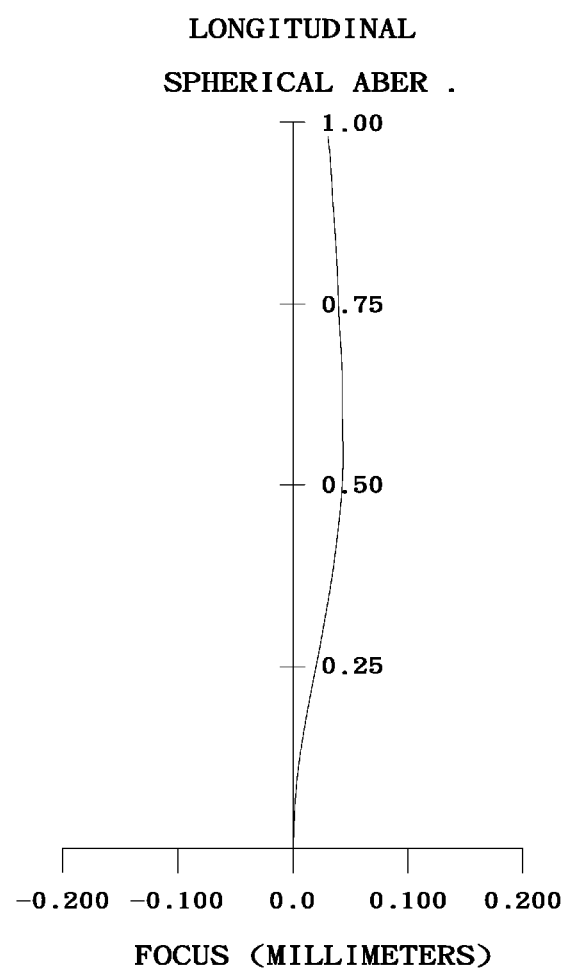
FIG. 10 is a schematic view showing a spherical aberration of the third preferred embodiment of the present invention.
Figure 11:
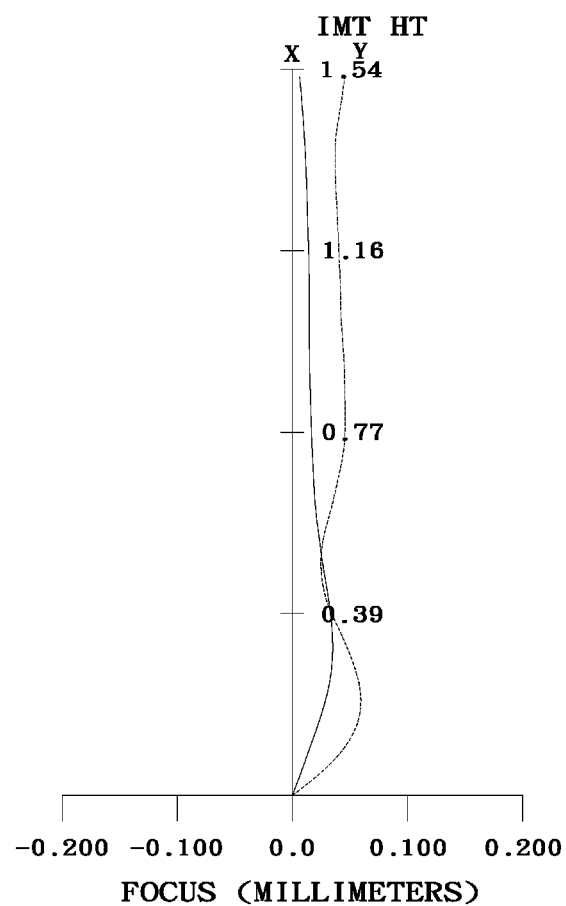
FIG. 11 is a schematic view showing an astigmatic aberration of the third preferred embodiment of the present invention.
Figure 12:
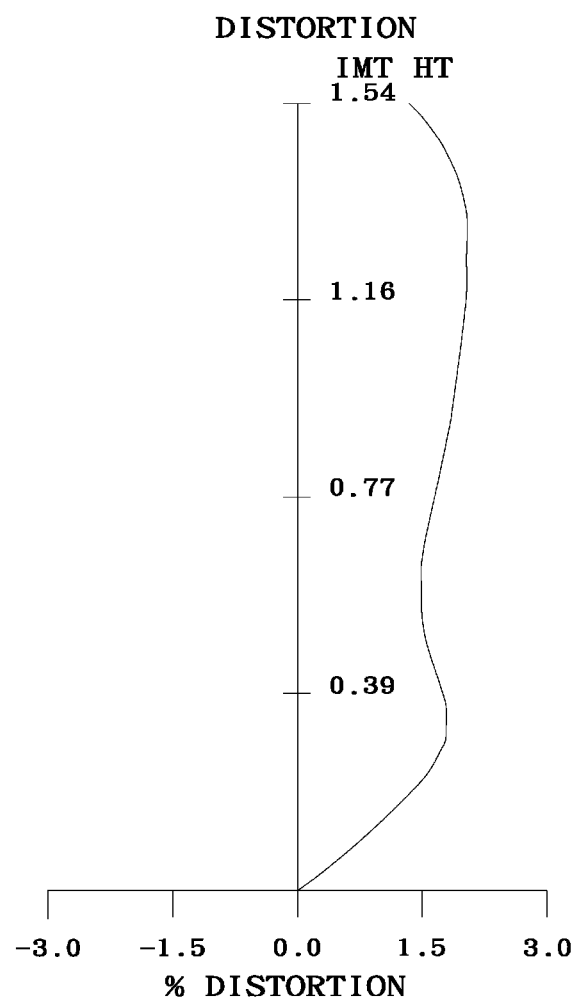
FIG. 12 is a schematic view showing a distorted aberration of the third preferred embodiment of the present invention.

Referring to FIG. 10, a schematic view of a spherical aberration of the third preferred embodiment of the present invention is shown. Referring to FIG. 11, a schematic view of an astigmatic aberration of the third preferred embodiment of the present invention is shown. Referring to FIG. 12, a schematic view of a distorted aberration of the third preferred embodiment of the present invention is shown. The measured astigmatic aberration, distorted aberration, the spherical aberration are in the standard scope and have a good optical performance and imaging quality according to the above-mentioned figures.

The micro-optical image capturing device utilizes a plurality of aspheric surface lens with five lenses, the front four lens of which have refractive power sequentially arranged as positive, positive, negative, and positive, and the filter unit 70 which filters a light of infrared wave length and allows the visible light of the demanded wave length. The filter unit 70 is preferably adopted by an infrared stopping filter unit for being used for the visible light image.

By making use of the aspheric surface that corrects the aberration and reduces the common difference sensitivity, the aberration is corrected and the full length of the lens optical system is reduced. Further, the device has a ultra-wide-angle with an image capturing angle over 85°. The first, second, third, fourth, and fifth lenses are preferably adopted by plastic, which is conducive to eliminate the aberration and reduce the weight of the lens. The optical system consists of five plastic lenses and provides with the low common difference sensitivity. The optical system is also easy to be manufactured and benefits a mass production. Furthermore, the optical system has a good imaging quality to meet the requirement of miniaturizing the portable image capturing products.

While we have shown and described the embodiment in accordance with the present invention, it should be clear to those skilled in the art that further embodiments may be made without departing from the scope of the present invention.

I claim:

1. A wide-angle imaging lens assembly with five lenses comprising a fixing diaphragm and an optical set; said optical set including a first lens, a second lens, a third lens, a fourth lens, and a fifth lens, an arranging order thereof from an object side to an image side being:

said first lens having a negative refractive power and a convex surface directed toward said object side; at least one surface of said first lens being aspheric;

said fixing diaphragm;

said second lens having a positive refractive power and a convex surface directed toward said image side; at least one surface of said second lens being aspheric;

said third lens having a lens with a positive refractive power and a convex surface directed toward said image side; at least one surface of said third lens being aspheric;

said fourth lens having a lens with a positive refractive power and convex surfaces directed toward said object side and said image side; at least one surface of said fourth lens being aspheric; and said fifth lens having a concave surface directed toward said object side and a concave surface with a corrugated contour directed toward said image side and disposed near an optical axis; at least one surface of said fifth lens being aspheric.

2. The wide-angle imaging lens assembly with five lenses as claimed in claim 1 further satisfying the following expressions: 2<TL/f<2.5 and −5<R7/R8<−2, wherein said TL is defined as a distance from a top point of said object side of said first lens to an imaging surface side, said f is defined as a focal length of said entire lens assembly, said R7 is defined as a radius of a proximal curvature of an object side surface of said fourth lens, and said R8 is defined as a radius of a proximal curvature of an image side surface of said fourth lens.

3. The wide-angle imaging lens assembly with five lenses as claimed in claim 1 further satisfying the following conditional expression: 0.5<f4/f<1.5, wherein said f4 is defined as a focal length of said fourth lens, and said f is defined as a focal length of said entire lens assembly.

4. The wide-angle imaging lens assembly with five lenses as claimed in claim 1, wherein a shape of said aspheric surface satisfies a formula of:

$$z = \frac{ch^2}{1 + [1 - (k+1)c^2 h^2]^{0.5}} + Ah^4 + Bh^6 + Ch^8 + Dh^{10} + Eh^{12} + Gh^{14} + \ldots$$

wherein said z is defined as a position value about a location at a height of h along a direction of said optical axis referring to a surface top point, said k is defined as a conic constant, said c is a reciprocal of a radius of a curvature, and said A, B, C, D, E, G, etc. are defined as high-order aspheric surface coefficients.

* * * * *